(12) United States Patent
Hochberg et al.

(10) Patent No.: US 11,310,360 B2
(45) Date of Patent: Apr. 19, 2022

(54) SYSTEM AND METHODS THEREOF FOR REAL-TIME FRAUD DETECTION OF A TELEPHONE CALL TRANSACTION (71) Applicant: Clear Labs Israel Ltd., Tel Aviv (IL)

(72) Inventors: Gal Hochberg, Tel Aviv (IL); Doron Shamia-Sadeh, Pardes Hanna Karkur (IL)

(73) Assignee: Clear Labs Israel Ltd., Tel Aviv (IL)

( * ) Notice: Subject to any disclaimer, the term of this patent is extended or adjusted under 35 U.S.C. 154(b) by 0 days.

(21) Appl. No.: 17/126,767

(22) Filed: Dec. 18, 2020

(65) Prior Publication Data

US 2021/0195017 A1 Jun. 24, 2021

Related U.S. Application Data (60) Provisional application No. 62/951,529, filed on Dec. 20, 2019.

(51) Int. Cl.
*H04M 3/22* (2006.01)
*H04M 3/436* (2006.01)
*H04M 3/38* (2006.01)

(52) U.S. Cl.
CPC ....... *H04M 3/2281* (2013.01); *H04M 3/2218* (2013.01); *H04M 3/382* (2013.01); *H04M 3/436* (2013.01); *H04M 2203/6027* (2013.01)

(58) Field of Classification Search
CPC .... H04M 3/2281; H04M 3/382; H04M 3/436; H04M 3/2218; H04M 2203/6027; H04M 15/58; H04M 15/47; H04M 2215/0188; H04M 2215/0148; H04M 15/70; H04M 15/53; H04M 15/61; H04M 15/765; H04M 15/49; H04M 15/72; H04M 15/88; H04M 3/38; H04M 15/46; H04M 15/42; H04M 15/62; H04M 15/723; H04M 2215/32; H04M 7/0078; H04M 15/745; H04M 15/7652; H04M 15/77; H04M 15/8038; H04M 15/8055; H04M 15/83; H04M 15/84; H04M 15/85; H04M 15/887; H04M 2201/41; H04M 2203/551; H04M 2203/556; H04M 2215/0116; H04M 2215/014; H04M 3/36; H04M 3/42059; H04M 3/5175; H04M 15/06; H04M 15/08; H04M 15/51; H04M 15/56; H04M 15/64; H04M 15/73; H04M 15/7655;

(Continued)

(56) References Cited

U.S. PATENT DOCUMENTS 3,560,658 A 2/1971 Molloy
4,412,101 A 10/1983 Brown et al.

(Continued)

*Primary Examiner* — Akelaw Teshale
(74) *Attorney, Agent, or Firm* — M&B IP Analysts, LLC (57) ABSTRACT

A method for detecting of fraudulent calls is provided. The method includes initiating, by an origin node, a call to a target node, and generating, by the origin node, a first call data record (CDR) for the call, wherein the CDR includes at least one call parameter of the call recorded by the origin node upon termination of the call. The method also includes generating, by the origin node, a first secure CDR that contains the first CDR, sending, by the origin node, the first secure CDR to the target node, and generating, by the origin node, a fraud notification based on a second secure CDR received from a first node and the first secure CDR.

24 Claims, 8 Drawing Sheets

(58) Field of Classification Search
CPC .. H04M 15/772; H04M 15/82; H04M 15/825; H04M 15/8278; H04M 15/835; H04M 15/8353; H04M 15/844; H04M 15/853; H04M 15/857; H04M 15/886; H04M 15/90; H04M 17/10; H04M 17/103; H04M 19/02; H04M 1/66; H04M 1/663; H04M 2201/40; H04M 2203/558; H04M 2203/559; H04M 2203/6054; H04M 2203/651; H04M 2207/18; H04M 2215/0152; H04M 2215/016; H04M 2215/0196; H04M 2215/202; H04M 2215/2026; H04M 2215/54; H04M 2215/62; H04M 2215/725; H04M 2215/7254; H04M 2215/7263; H04M 2215/788; H04M 3/385; H04M 3/387; H04M 3/42042; H04M 3/42102; H04M 3/42221; H04M 3/42314; H04M 3/42348; H04M 3/51; H04M 3/5166; H04M 3/543; H04M 3/56; H04M 3/58; H04M 7/0048; H04M 7/0054

See application file for complete search history.

(56) References Cited

U.S. PATENT DOCUMENTS

| | | | |
|---|---|---|---|
| 5,423,065 A | 6/1995 | Pinard | |
| 6,047,051 A * | 4/2000 | Ginzboorg | G06Q 20/102 235/380 |
| 6,801,607 B1 * | 10/2004 | Marchand | H04M 15/00 379/111 |
| 6,850,606 B2 | 2/2005 | Lawyer et al. | |
| 7,155,417 B1 | 12/2006 | Sagar et al. | |
| 7,203,291 B2 | 4/2007 | Morrison et al. | |
| 7,236,954 B1 * | 6/2007 | Marchand | G06Q 30/0225 455/406 |
| 7,328,042 B2 | 2/2008 | Choksi | |
| 7,702,346 B2 | 4/2010 | Choksi | |
| 8,055,771 B2 | 11/2011 | Shen et al. | |
| 8,150,437 B2 | 4/2012 | Choksi | |
| 9,282,197 B2 | 3/2016 | Kenington et al. | |
| 9,729,727 B1 * | 8/2017 | Zhang | G06N 20/10 |
| 9,774,726 B1 | 9/2017 | Jenkins et al. | |
| 10,091,349 B1 | 10/2018 | Rao et al. | |
| 10,263,954 B2 | 4/2019 | Lee et al. | |
| 10,285,026 B2 | 5/2019 | Dar | |
| 10,477,012 B2 | 11/2019 | Rao et al. | |
| 2003/0147516 A1 * | 8/2003 | Lawyer | H04M 15/41 379/114.14 |
| 2004/0203750 A1 * | 10/2004 | Cowdrey | H04M 15/47 455/432.1 |
| 2005/0097032 A1 | 5/2005 | Benco et al. | |
| 2005/0287983 A1 | 12/2005 | Armanino et al. | |
| 2006/0013372 A1 * | 1/2006 | Russell | H04M 15/41 379/114.14 |
| 2006/0229057 A1 | 10/2006 | Farrugia et al. | |
| 2011/0244872 A1 | 10/2011 | Quinn | |
| 2012/0072453 A1 * | 3/2012 | Guerra | G10L 17/00 707/776 |
| 2012/0263285 A1 * | 10/2012 | Rajakumar | G10L 17/00 379/189 |
| 2015/0055763 A1 * | 2/2015 | Guerra | G06Q 99/00 379/88.02 |
| 2015/0381801 A1 * | 12/2015 | Rajakumar | G10L 25/48 379/88.01 |
| 2016/0065732 A1 * | 3/2016 | Davis | H04M 3/5175 379/265.02 |
| 2016/0352921 A1 | 12/2016 | Ikäheimo et al. | |
| 2017/0142252 A1 * | 5/2017 | Bhupati | H04M 1/575 |
| 2018/0270348 A1 * | 9/2018 | Li | H04W 4/16 |
| 2019/0052994 A1 | 2/2019 | Dar | |
| 2019/0222978 A1 | 7/2019 | Dar | |
| 2019/0349481 A1 | 11/2019 | Uzelac et al. | |

* cited by examiner

SYSTEM AND METHODS THEREOF FOR REAL-TIME FRAUD DETECTION OF A TELEPHONE CALL TRANSACTION

CROSS-REFERENCE TO RELATED APPLICATIONS

This application claims the benefit of U.S. Provisional Patent Application No. 62/951,529 filed on Dec. 20, 2019, the contents of the above-referenced application is hereby incorporated by reference.

TECHNICAL FIELD

The invention generally relates to securing telecommunication transactions and more particularly to real-time fraud detection.

BACKGROUND

Telecommunications has been growing at a rapid pace and is a large industry that involves significant amounts of money. With that said, each telecommunication transaction, i.e., the price charged for the connecting of an origin node to a target node is relatively small. This, almost by definition, raises the opportunity for fraud as small, practically unnoticeable costs for any give end-user may not merit the efforts to detect the defrauder, especially as they grow in sophistication.

In order to perform a long-distance call, i.e., a call that is performed between two or more different carriers, there is an opportunity for fraud. This is especially true when more carriers are involved. That happens as calls are handed off between carriers for the purpose of routing a call from its origin node towards its destination node. For that purpose, one or more intermediate nodes may be used for routing a call. Telephone companies, also referred to as Telcos, provide a call data record (CDR) which may be evaluated against Telco-specified rules. This system allows each participating Telco, i.e., origin node, intermediate node and target node to define its own sets of call evaluation rules. These rules may trigger alerts that are then evaluated for a variety of risk factors to determine if a particular call is or was a victim of fraud or a fraudulent call. Examples for fraudulent call are discussed below.

In a typical predictive model scores are provided to indicate the likelihood that a call made is fraudulent and is examined by analysts. The final decisions are used to determine future like cases to be fraudulent or not. Clearly the disadvantage of this system that in order to detect a future fraud, a past fraud has to be determined and therefore new frauds may take time to be detected and depending on the level of sophistication this may take a significantly long time.

Another class of a call fraud detection solution utilizes the CDR of a call for the purpose of detecting fraud. In such cases the CDRs generated for each call are analyzed using data analytics and data correlations to generate fraud risk ratings. In some cases, fuzzy logic is used to make the determination of the risk factors. Typically, such systems include a CDR database that is accessed repeatedly for the purpose of determination particular fraud risk ratings. Moreover, such systems provide their fraud risk ratings using complex heuristics that require the accumulation of all the individual fraud risk scores.

It therefore requires that the system collects, organizes, transforms, analyses and quantifies the CDR data into data analytics and data correlations. After that fuzzy logic is applied for the purpose of determination a fraud risk rating for each call that is handled by the system. While these fraud detection systems have certain advantages over the predictive models, they demonstrate relatively long latency until detection of a fraud due to the need to perform complicated the complicated analytics as described. Moreover, they still provide only a fraud risk rating, but do not make a determination of a fraud that can allow effective reconciliation of accounting between Telco nodes.

Fraud is dynamic and ever changing and therefore it is practically inherent that there is a delay between an instance of fraud and its actual detection. In some cases, a large number of undetected frauds may take place before suspicion reaches a detectable level. For example, call hijacking may take place, where a node causes a connection to a responder that only attempt to keep the caller on the call for as long as possible and then attempt to charge for the call.

It would therefore be advantageous to provide a solution that overcomes the deficiencies of the prior art solutions and provide a real-time resolution of fraud so that accounting reconciliation may take place in real-time as well as providing fraud alerts.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for detecting of fraudulent calls. The method comprises: initiating, by an origin node, a call to a target node; generating, by the origin node, a first call data record (CDR) for the call, wherein the CDR includes at least one call parameter of the call recorded by the origin node upon termination of the call; generating, by the origin node, a first secure CDR that contains the first CDR; sending, by the origin node, the first secure CDR to the target node; and generating, by the origin node, a fraud notification based on a second secure CDR received from a first node and the first secure CDR.

Certain embodiments disclosed herein also include a method for detecting of fraudulent calls. The method comprises: receiving, by a target node, a call by the target node from an origin node; generating, by the target node, a first call data record (CDR) that includes at least one call parameter recorded by the target node upon termination of the call; receiving, by the target node, a first secure CDR that contains the first CDR; and generating, by the target node, a fraud notification when the first secure CDR is determined to be invalid.

Certain embodiments disclosed herein also include a Telco provider origin node for detecting of fraudulent calls. The Telco provider origin node comprises: a processing circuitry; and a memory, the memory containing instructions that, when executed by the processing circuitry, configure the origin node to: initiate a call to a target node; generate a first call data record (CDR) for the call, wherein the CDR includes at least one call parameter of the call recorded by the origin node upon termination of the call; generate a first secure CDR that contains the first CDR; send the first secure CDR to the target node; and generate a fraud notification based on a second secure CDR received from a first node and the first secure CDR.

Certain embodiments disclosed herein also include a Telco provider origin node for detecting of fraudulent calls. The Telco provider origin node comprises: a processing circuitry; and a memory, the memory containing instructions that, when executed by the processing circuitry, configure the target node to: receive a call by the target node from an origin node; generate a first call data record (CDR) that includes at least one call parameter recorded by the target node upon termination of the call; receive a first secure CDR that contains the first CDR; and generate a fraud notification when the first secure CDR is determined to be invalid.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION OF THE INVENTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

In an example embodiment, a call data record (CDR) of a call routed between Telco nodes from a call originator to a call target, at times using an interim Telco allows for accounting reconciliation Telco nodes and acceptance or decline of charges based on fraud risks are disclosed. In order to perform real-time flagging of fraud attempt, the CDR is signed and sent from the originator Telco node towards the target Telco node. If it is an interim Telco node, the interim Telco node validates the signed CDR and forwards it to the target Telco node. At the target Telco node, a CDR is created that allows the comparison of the call duration as experienced by the origin Telco node. If a mismatch is identified by either or both of the originator and target Telco nodes, a fraud is flagged. The signed CDRs using private and public keys prevent the possibility of fraud especially because the fraud detection can take place in real time.

Figure 1A:
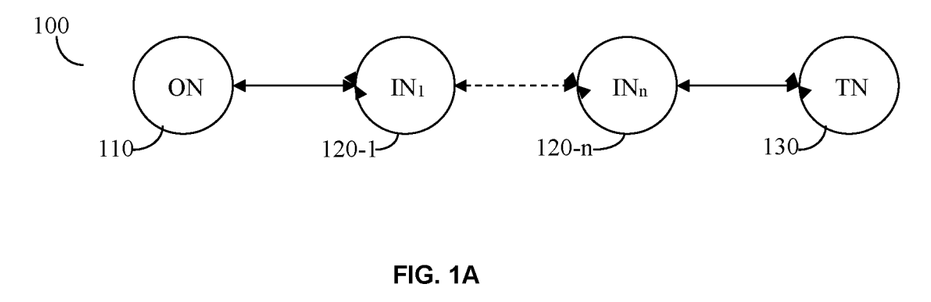
FIG. 1A is a communication diagram between an origin caller to a target caller via Telco nodes utilized to describe the various disclosed embodiments.

FIG. 1A depicts an example communication diagram 100 between an origin caller to a target caller via Telco nodes utilized to describe the disclosed embodiments. A caller node 105, may be a telephone, a cellular phone, and any other communication device that may communicate with an origin Telco node 110 for the purpose of connecting to a target node 135. The target Telco node 130 may be a telephone, a cellular phone, and any other communication device that may communicate with a target Telco node 130.

In order for a call to take place between caller node 105 and target Telco node 130 the call is to be routed and there are a couple of options for that. In the first case the origin Telco node 110 may connect directly to the target Telco node 130 without any intermediary Telco node in between them. In a second case, the first case the origin Telco node 110 may connect indirectly to the target Telco node 130 using one or more intermediary Telco nodes 120 that route the call between them. As noted there may be between 1 to N number of intermediary Telco nodes 120, where N is an integer starting at '1'. In the case where there is no intermediary Telco node 120, the value may be set to "0" there by denoting that an intermediary Telco node 120 does not exist in the scheme.

It should be appreciated that in parallel to the routing of the call, i.e., transfer of voice between the calling parties, there is further transfer of data related to the call. CDRs are provided between the participating Telco nodes 110, 120, and 130. One or more intermediary Telco nodes 120 may be in the path between the origin Telco node 110 and the target Telco node 130. A CDR may include some or all information for the following call parameters: caller identification number (e.g., a telephone number), target identification number (e.g., a telephone number), a start time, duration of call, origin Telco node, terminating Telco node, and, potentially, an intermediate Telco node.

In an embodiment, the CDRs exchanged by nodes are electronically signed by a verification signature. For example, but not by way of limitation using signature technologies well-known in the art, that allow for the validation of authenticity of a particular content provided by a valid user.

Following there are provided three cases that explain a process for detecting fraudulent calls according to disclosed embodiments. The process can be performed by any one of the origin Telco nodes 110, intermediary Telco node(s) 120, and the target Telco node 130. Each node may include hardware for executing the fraudulent calls detection objects.

Figure 1B:
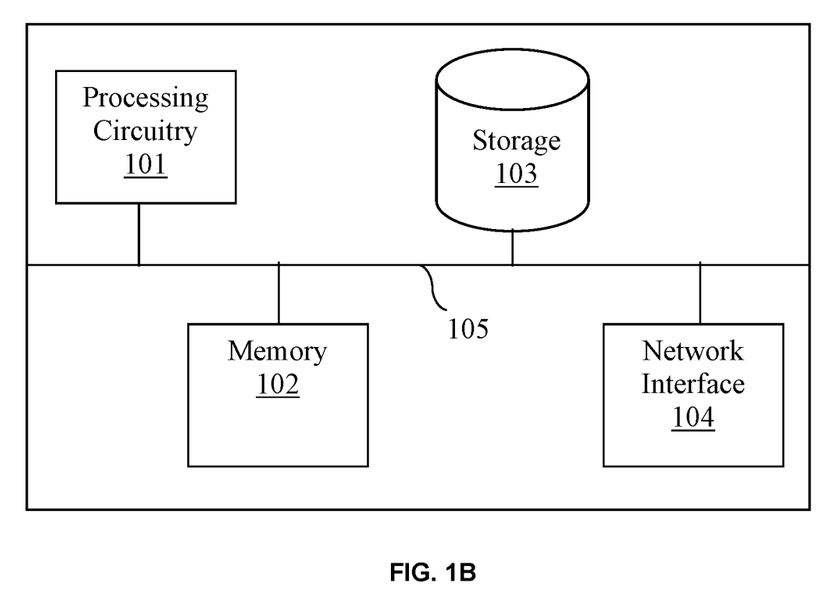
FIG. 1B is a hardware block diagram depicting Telco node, according to an embodiment.

FIG. 1B is an example hardware block diagram depicting a Telco node, according to an embodiment. The Telco node includes a processing circuitry 101 coupled to a memory 102, a storage 103, and a network interface 104. In an embodiment, the components of the Telco node may be communicatively connected via a bus 105.

The processing circuitry 101 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), general-purpose microprocessors, microcontrollers, digital signal processors (DSPs), and the like, or any other hardware logic components that can perform calculations or other manipulations of information.

The memory 102 may be volatile (e.g., random access memory, etc.), non-volatile (e.g., read only memory, flash memory, etc.), or a combination thereof.

In one configuration, software for implementing one or more embodiments disclosed herein may be stored in the storage 103. In another configuration, the memory 102 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 101, cause the Telco node to perform the various processes described herein.

The storage 103 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 104 allows the Telco node to communicate with the various components, devices, and systems described herein for production code static analysis, as well as other, like, purposes.

It should be understood that the embodiments described herein are not limited to the specific architecture illustrated in FIG. 1B, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

Implementing the disclosed embodiments in a node illustrated in FIG. 1B may be resulted in a technical effect that transforms such node to become a component of a fraud detection system. Lacking these additional features, it would fail to so do. Moreover, to be able to do so in real-time, that is close to the completion of the call initiated between the origin Telco node and the target Telco node.

The present disclosure has been discussed with reference to a telephone call. This should not be viewed as limiting the scope of the disclosed embodiments to voice call only. Calls may include voice calls, video calls and data calls and any combinations thereof, without departing from the scope of the invention.

Typically, the communications channels between Telco nodes are private, i.e., each two Telco nodes communicate their respective CDRs using their own (state) channel. These channels are only shared between them and therefore considered secure. In one embodiment, encryption of the content transmitted over the channel may be encrypted. Typically, this will not be done using an asymmetric key, rather, a symmetric key would be exchanged over an asymmetrically encrypted first time connection. This is less taxing computationally though the other party's public key may be used for encryption purposes.

Figure 2:
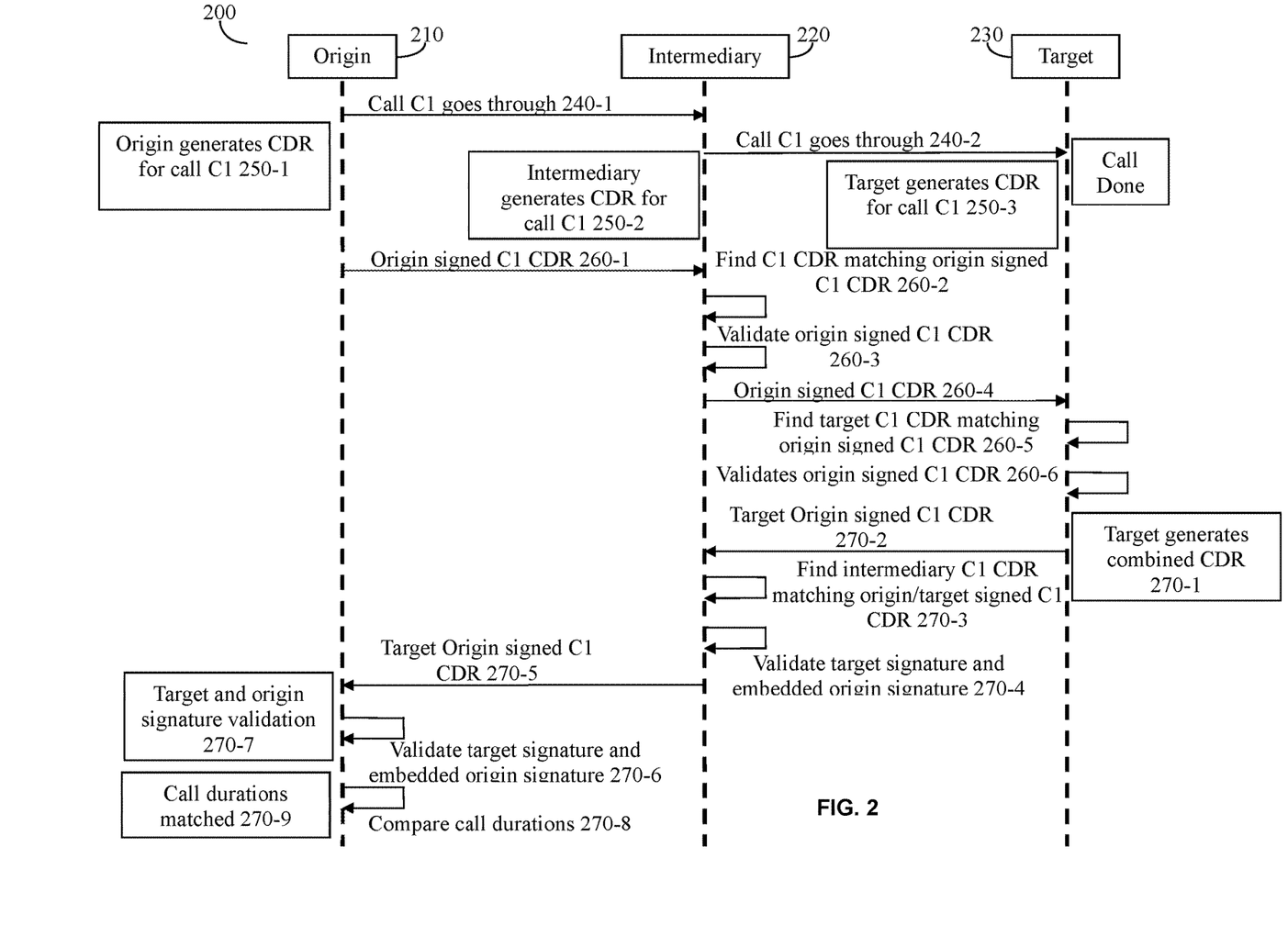
FIG. 2 is a timing diagram of real-time fraud detection scenario for a case where no fraud is detected according to an embodiment.

FIG. 2 is an example timing diagram 200 of real-time fraud detection scenario for a case where no fraud is detected according to an embodiment. Origin Telco node 210 initiates a call C1 240-1 directed toward intermediary Telco node 220 and then directed through 240-2 to target Telco node 230. Consequently, the origin Telco node 210 may generate a CDR 250-1 for call C1 while intermediary Telco node 220 generates a CDR 250-2 for call C1, and target Telco node 230 generates a CDR 250-3 for call C1.

Subsequently the origin Telco node 210 may generate a signed C1 CDR 260-1 based on the C1 CDR 250-1 to the intermediary Telco node 220. The intermediary Telco node 220 may find 260-2 the C1 CDR 250-2 that matches the received C1 CDR 260-1 which is subsequently validated 260-3 by the intermediary Telco node 220. Thereafter, the signed C1 CDR 260-1 is sent 260-4 by the intermediary Telco node 220 to the target Telco node 230. It should be appreciated that in another embodiment the intermediary Telco node 220 would send it to another intermediary Telco node (not shown) as discussed herein, without departing form the scope of the invention. The subsequent intermediary Telco node will essentially repeat the works disclosed herein with respect of the intermediary Telco node 220. At the target Telco node 230 it finds 260-5 the C1 CDR 250-3 that matches the signed/encrypted received C1 CDR 260-4 which is subsequently validated 260-6 by the target Telco node 230.

Once validated the target Telco node 230 may prepare 270-1 a combined CDR including of the target Telco node 230 C1 CDR 250-3 and the signed C1 CDR 250-1 as received via the intermediary Telco node 220. The combined target and origin Telco nodes C1 CDRs 270-1 is signed and sent back 270-2 to the intermediary Telco node 220. The intermediary Telco node 220 finds 270-3 its corresponding C1 CDR 250-2 that matches the received combined target and origin Telco nodes C1 CDRs 270-1. The intermediary Telco node 220 now validates 270-4 the received combined target and origin Telco nodes C1 CDRs 270-1.

Consequently, the intermediary Telco node 220 may transfer 270-5 the combined target and origin Telco nodes C1 CDRs 270-1 to the origin Telco node 210. The origin Telco node 210 validates 270-6 the received combined target and originating Telco nodes C1 CDRs 270-1. As no fraud has occurred in this particular transaction both origin Telco node 210 and target Telco node 230 are validated. Subsequently the call durations as appear in the C1 CDR 250-1 and C1 CDR 250-3 are compared 270-8 and if the call duration essentially matches the transaction is considered non-fraudulent 270-9. It should be noted that the signatures are provided by the origin Telco nodes 210 and the target Telco nodes 230 as the case may be.

Figure 3:
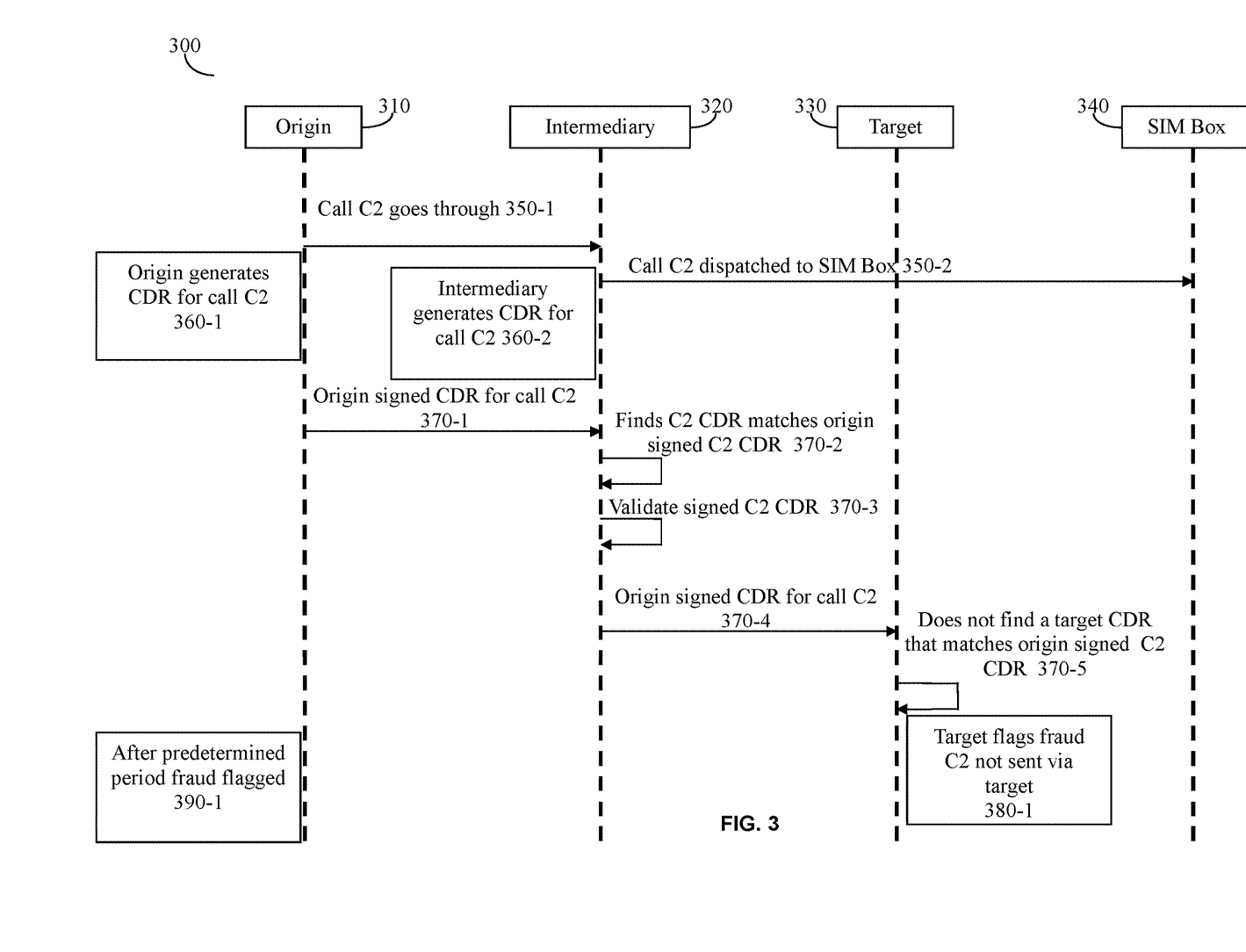
FIG. 3 is a timing diagram of real-time fraud detection scenario for a case where a complete call is redirected, and fraud is detected according to an embodiment.

FIG. 3 depicts an example timing diagram 300 of real-time fraud detection scenario for a case where a complete call is redirected, and fraud is detected according to an embodiment. Origin Telco node 310 initiates a call C2 350-1 directed toward intermediary Telco node 320 and then to be directed target Telco node 330. However, the call C2 is dispatched 350-2 to, for example but not by way of limitation, a SIM box 340 that is a fraudulent node. The call is completed 350-3 at the SIM box 340.

Consequently, an origin Telco node 310 generates a CDR 360-1 for call C2 and intermediary Telco node 320 generates a CDR 360-2 for call C2. Subsequently, the origin Telco node 310 generates a signed C2 CDR based on the C2 CDR 360-1 and sends 370-1 it to the intermediary Telco node 320. The intermediary Telco node 320 may find 370-2 the C1 CDR 360-2 that matches the received C1 CDR 370-1 which is subsequently validated 370-3 by the intermediary Telco node 320. Thereafter, the signed C1 CDR 370-1 is sent 370-4 by the intermediary Telco node 320 to the target Telco node 330.

One of ordinary skill in the art will readily appreciate, and without departing from the scope of the disclosed embodiments, that a plurality of intermediary Telco node (not shown but for intermediary Telco node 320) may be present and any one of them could be the one sending the call C2 to the SIM box 340 rather than to the target Telco node 330.

At the target Telco node 330 the signed C2 CDR 370-1 is received however the target Telco node 330 is unable to match 380-1 the received signed C2 CDR 370-1 with a corresponding one generated for the call C2 by the target Telco node 330. Therefore, target Telco node 330 flags a fraudulent call that was not processed via the target Telco node 330. No response is therefore sent to the intermediary Telco node 320.

After a predefined period of time from sending the signed C2 CDR 370-1 and lacking response from the target Telco node 330 in the form of a combined CDR as discussed with respect of FIG. 2, the origin Telco node 310 flags a fraud for call C2. Flags may be various types of notification such as signals, messages, and the like commonly exchanged electronically to provide electronic information. One of ordinary skill in the art will appreciate that the signatures are provided by the origin Telco node 310 and the target Telco node 330 as the case may be.

Figure 4:
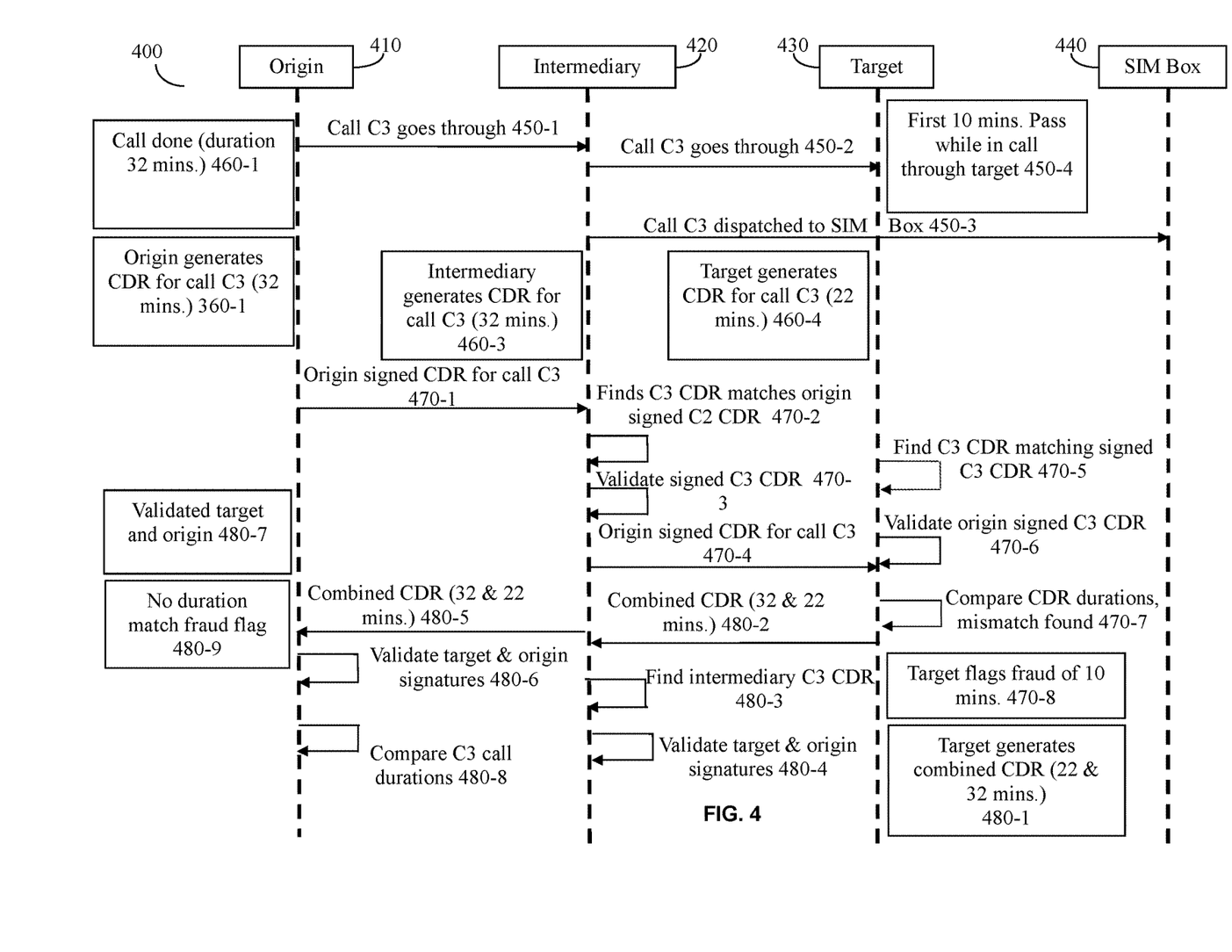
FIG. 4 is a timing diagram of real-time fraud detection scenario for a case where a portion of a call is redirected, and fraud is detected according to an embodiment.

FIG. 4 is an example timing diagram 400 of real-time fraud detection scenario for a case where a portion of a call is redirected and fraud is detected according to an embodiment. Origin Telco node 410 initiates a call C3 450-1 directed toward intermediary Telco node 420 and then to be directed to target Telco node 430. The call C3 is directed to the target Telco node 430. However, the first 10 minutes of the call (as an exemplary and non-limiting time period) are directed 450-3 to, for example, but not by way of limitation, a SIM box 440 that is performed through the target Telco node 430.

Consequently, an origin Telco node 410 generates a CDR 460-1 for call C3 for, for example a duration of 32 minutes which is the duration of the call, and intermediary Telco node 420 generates a CDR 460-3 for call C3 which is also for 32 minutes. Origin Telco node 410 further generates a signed C3 CDR 460-2 which is then sent 470-1 to the intermediary Telco node 420. As has been noted, one of ordinary skill in the art would readily appreciate that a plurality of intermediary nodes (not shown but for intermediary Telco node 420) may be present in this path between the origin Telco node 410 and the target Telco node 430.

For the call C3 the target Telco node 430 generates a C3 CDR that is only for 22 minutes as the remaining 10 minutes were fraudulently directed via the SIM box 440. The origin Telco node 410 generates a signed C3 CDR 460-2 based on the C3 CDR 460-1 and sends 470-1 it to the intermediary Telco node 420. The intermediary Telco node 420 may find 470-2 the C3 CDR 460-3 that matches the received C3 CDR 470-1.

Subsequently, the C3 CDR 460-3 is validated 470-3 by the intermediary Telco node 420 and thereafter the origin Telco node 410 assigns C3 CDR 460-2 to be sent by the intermediary Telco node 420 to the target Telco node 430.

It should be noted that a plurality of intermediary Telco nodes (not shown but for intermediary Telco node 420) may be present and any one of them could be the one sending a portion of the call C3 to the SIM box 440 rather than to the target Telco node 430.

At the target Telco node 430 the signed C3 CDR 470-2 is received and an attempt is made to find 470-4 the corresponding C3 CDR generated by target Telco node 430. Once found the received signed C3 CDR 470-2 is validated 470-5 by the target Telco node 430. Then, a comparison 470-7 takes place between the C3 CDR generated by the target Telco node 430 and then receives signed C3 CDR 470-2. As a discrepancy of 10 minutes is found between the two CDRs the target Telco node 430 flags a fraud 470-8.

The target Telco node 430 now generates 480-1 a combined CDR that is a combination of its own C3 CDR of 22 minutes and the received signed C3 CDR 470-2. The combined signed CDRs 480-1 is sent 480-2 to the intermediary Telco node 420. Subsequently the intermediary Telco node 420 may find 480-3 the C3 CDR 460-3 that it had generated and validates 480-4 that it was received from the target Telco node 430 using, for example, but not by way of limitation, a signature provided by the target Telco node 430.

Consequently, the combined signed CDRs 480-1 is forwarded 480-5 to the origin Telco node 410. The origin Telco node 410 validates 480-6 that it was received from the target Telco node 430 using, for example, but not by way of limitation, a signature provided by the target Telco node 430. As a result of the validation, it is determined that both the target and the origin are valid 480-7, and subsequently a comparison takes place between the C3 CDRs received and the C3 CDR generated by the origin Telco node 410. As the call durations do not match the origin Telco node 410, flags a fraud of 10 minutes. It should be appreciated that the signatures are provided by the origin Telco node 410 and the target Telco node 430 as the case may be.

Figure 5:
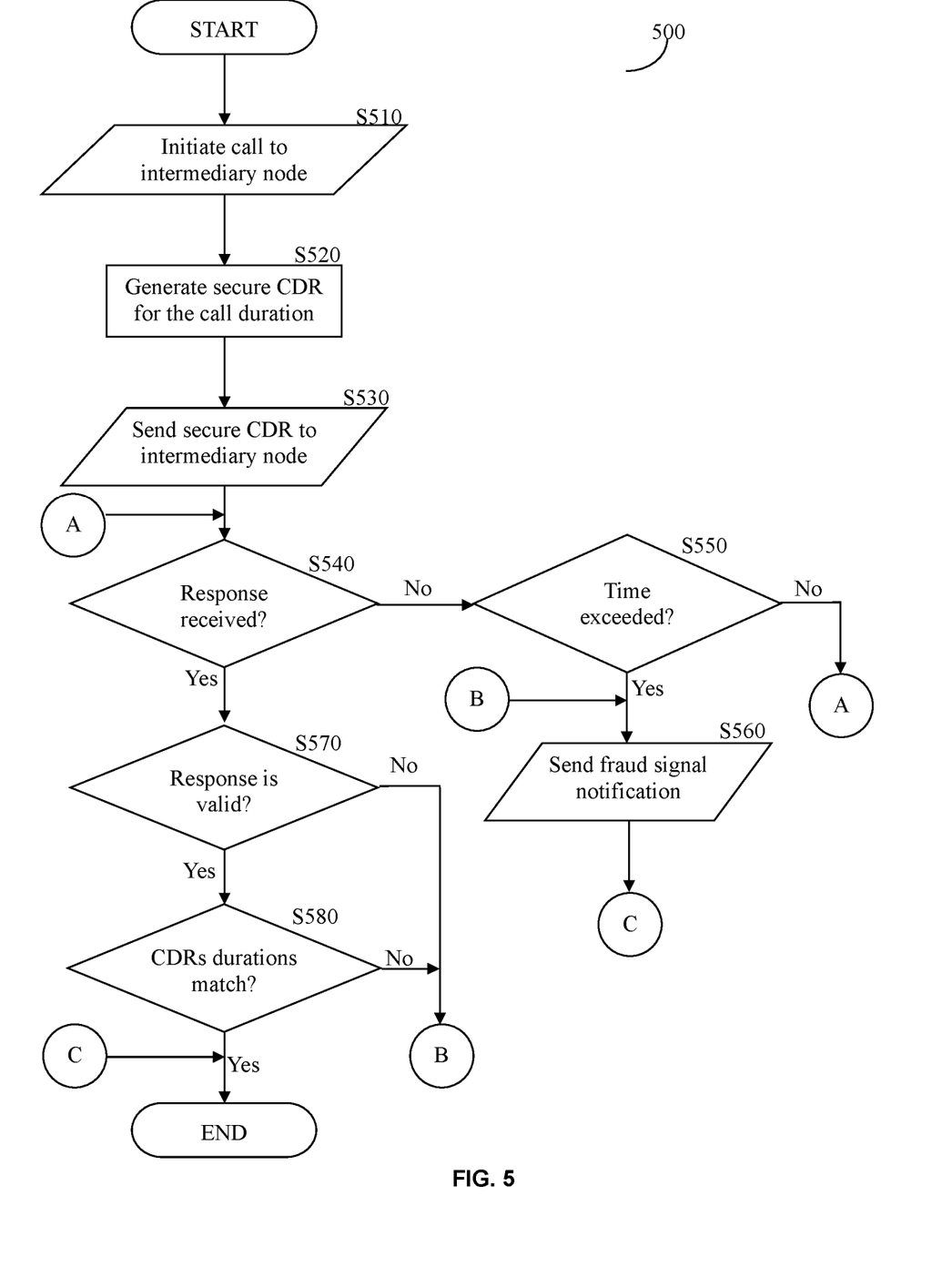
FIG. 5 is a flowchart of operation of an origin Telco node for fraud detection according to an embodiment.

FIG. 5 shows an example flowchart 500 of operation of an origin Telco node for fraud detection according to an embodiment.

At S510 a call is directed from the origin Telco node, for example origin Telco node 110, to an intermediary Telco node, for example intermediary Telco node 120. At S520, upon completion of the call the origin Telco node generates a CDR for the call that includes the duration of the call. The generated is signed. At S530 the signed CDR is sent to the intermediary Telco node.

At S540 it is checked whether a response was received, and if not execution continues with S550; otherwise, execution continues with S570. At S550, it is checked whether a predetermined time has elapsed from the sending of the signed CDR in S530, and if so execution continues with S560; otherwise, execution continues with S540. At S560 a fraud signal is sent due to the fact that no response was sent from the target Telco node within the time allotted to receive such a response, after which execution terminates.

At S570 it is checked whether the response that was received is a valid response, for example, by checking that it came from a valid source that appropriately signed the CDR and if so execution continues with S580; otherwise, execution continues with S560 where a fraud flag is sent indicating that a non-valid response was received, after which execution terminates.

At S580 it is checked whether the CDRs received from the target Telco node and generated by the origin Telco node essentially match and if so execution terminates as no fraud has been detected; otherwise, execution continues with S560 where a fraud flag is sent indicating that a time discrepancy was found between the CDRs. In one embodiment, the flag further includes the indication of the time mismatch. It should be appreciated that the principles of the disclosed embodiments allow for real-time detection of call fraud at the origin Telco node, that is, the fraud detection is made close to the termination of the call itself and not as part of a reconciliation process happening typically as an off-line process.

Figure 6:
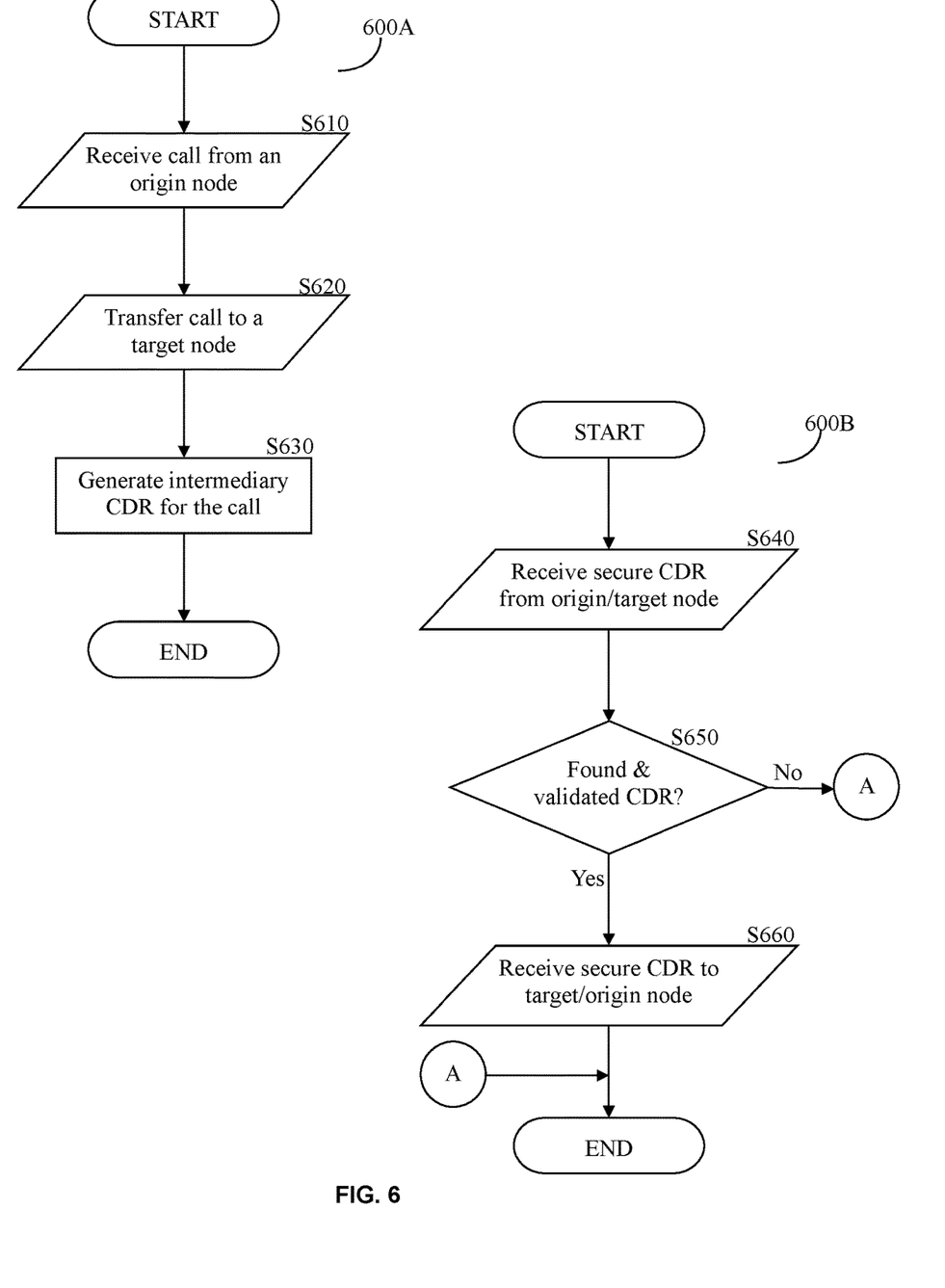
FIG. 6 is a flowchart of operation of an intermediary Telco node for fraud detection according to an embodiment.

FIG. 6 shows an example flowchart 600 of operation of an intermediary Telco node for fraud detection according to an embodiment. The flowchart 600 includes two separate flowcharts 600A and 600B. In flowchart 600B the operation of generating a CDR for a call flowing through the intermediary Telco node is described.

At S610 a call is received from an origin Telco node, for example origin Telco node 110, by an intermediary Telco node, for example intermediary Telco node 120. The call is directed to a target Telco node, for example target Telco node 130, by the intermediary Telco node. At S620, the received call is transferred to the target node.

At S630, a CDR for the call which is retained therein for future use after which execution terminates is generated. Flowchart 600B describes the flow of CDRs from the intermediary Telco node to the target Telco node and vice versa as they are handled at the intermediary node. The target Telco node is, for example, target Telco node 130.

At S640 a signed CDR is received by the intermediary Telco node from either the origin Telco node or the Target Telco node. At S650 it is checked whether the corresponding CDR was found and validated by the intermediary Telco node, i.e., if the call has actually passed through the intermediary Telco node and if so execution continues with S660; otherwise, execution terminates as this has no relevancy to the intermediary Telco node.

At S660 the intermediary Telco node transfers the received signed CDR to either one of the target Telco node or the origin Telco node depending on the necessary direction. That is, if the CDR was received from the origin Telco node it will be forwarded to the target Telco, or vice versa if the CDR was received from the target Telco node, after which execution terminates.

Figure 7:
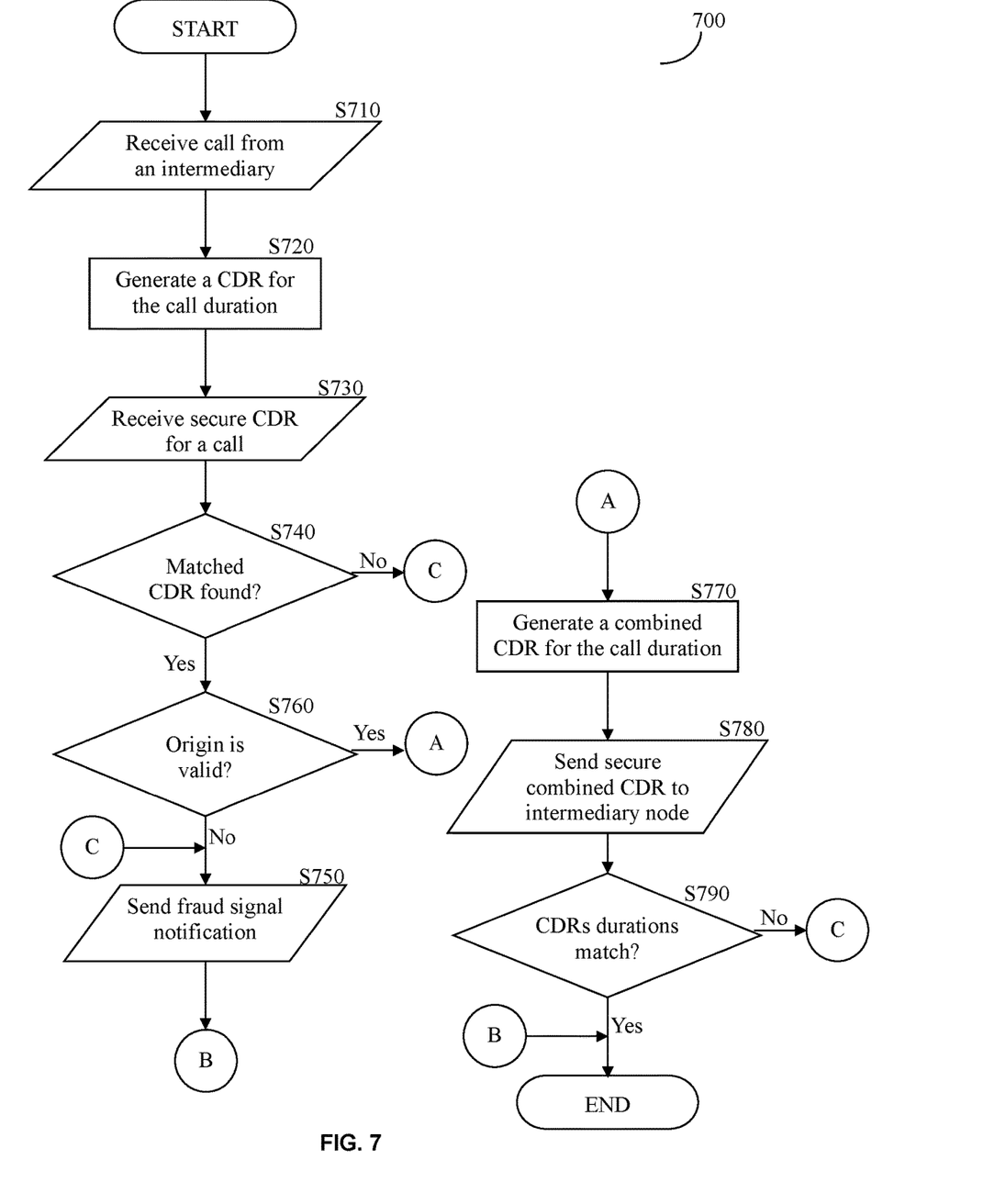
FIG. 7 is a flowchart of operation of a target Telco node for fraud detection according to an embodiment.

FIG. 7 shows an example flowchart 700 of operation of a target Telco for fraud detection according to an embodiment. At S710 a call is received from an intermediary Telco node, for example intermediary Telco node 120, by a target Telco node, for example target Telco node 130.

At S720 a CDR is generated for the call that includes the duration of the call. In S730 a signed CDR is received. At S740, it is checked if a match is found with a CDR generated by the target Telco node, and if so execution continues with S760; otherwise, in S750 a fraud signal is generated to indicate that no such CDR was found.

In one embodiment, the generated flag may also indicate a case were no CDR was received from the origin Telco node, for example origin Telco node 110, after a predetermined time period has elapsed.

At S760 the received CDR is validated for example, but not by way of limitation, by checking a signature. If the CDR is validated, execution continues with S770; otherwise, execution continues with S750 where a flag signals that it was not possible to validate the transaction after which execution terminates.

At S770 a combined CDR is generated as explained herein in greater detail and is not repeated herein, just mentioning that duration as determined by the target Telco node and duration determined by the origin Telco node are both included. At S780 a signed combined CDR is sent via the intermediary Telco node to the origin Telco node. At S790 it is checked whether the duration determined by the origin Telco node and the duration determined by the target Telco node essentially match (there may be a small difference of up to, for example, a minute or another predetermined threshold value) and is so execution terminates; otherwise, execution continues with S750 where a flag signals that a fraud was detected and the mismatch duration may be provided.

It should be appreciated that the disclosed embodiments allow for real-time detection of call fraud at the target Telco node. That is, the fraud detection is made close to the termination of the call itself and not as part of a reconciliation process happening typically as an off-line process.

It should be further appreciated that the disclosed embodiments may be used for a communication between an origin Telco node and a target Telco node without departing from the scope of the disclosed.

Figure 8:
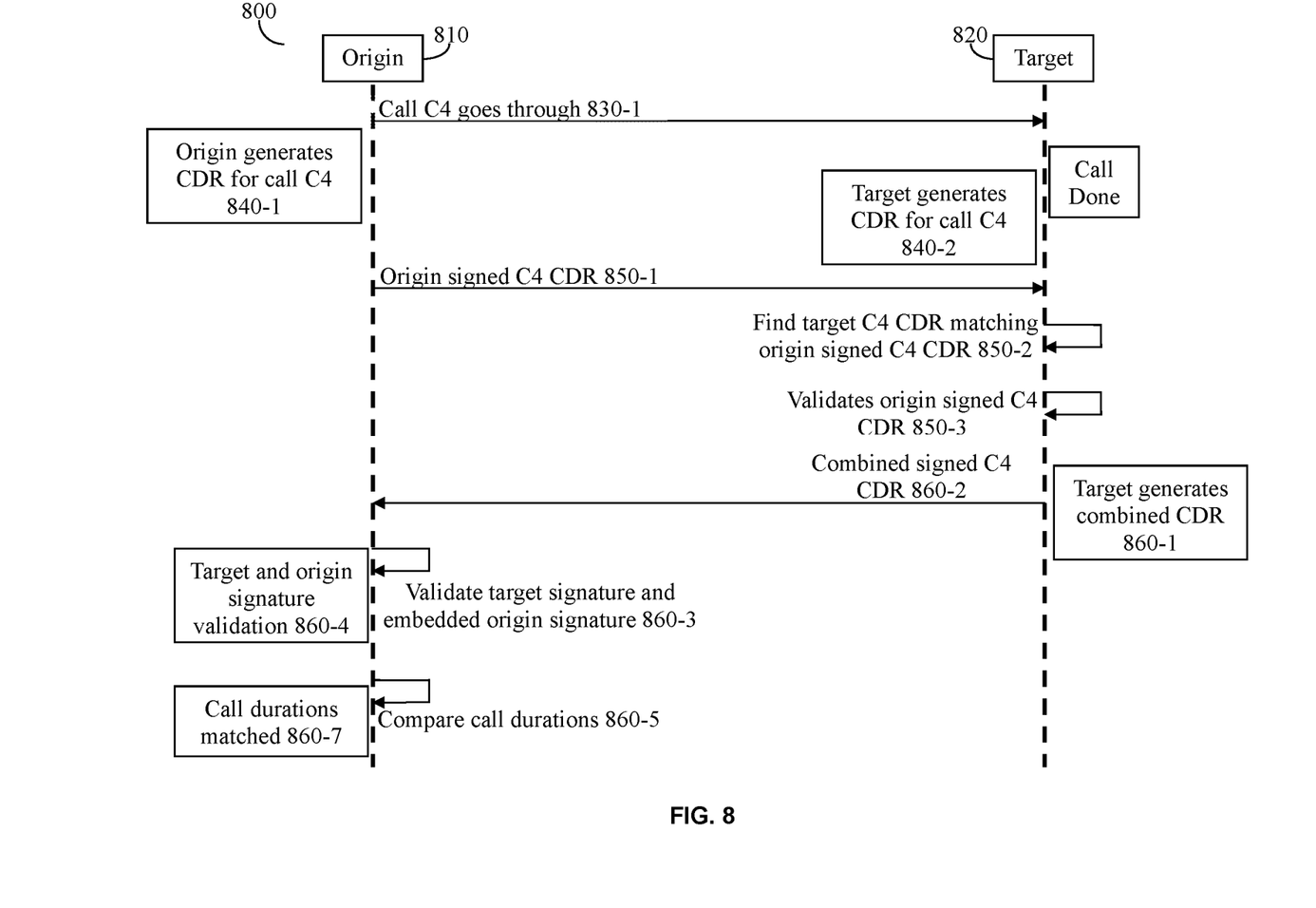
FIG. 8 is timing diagram of real-time fraud detection scenario for a case of direct communication between an origin Telco node and a target Telco node according to an embodiment.

FIG. 8 shows an example timing diagram 800 of real-time fraud detection scenario for a case of direct communication between an origin Telco node and a target Telco node according to an embodiment. The timing diagram 800 shows the communication and actions happening between an origin Telco node 810 and a target Telco node 820 according to an embodiment.

The origin Telco node 810 initiates and consumes 830-1 a call C4 directly to target Telco node 820. Once the call is over, the origin Telco node 810 generates a CDR 840-1 for call C4 that includes at least the duration of the call. Upon completion of the call the target Telco node 820 generates 840-2 its CDR for call C4. The origin Telco node 810 sends 850-1 a secure origin CDR based on the origin generated CDR to the target Telco node 820. Securing of the CDR may be performed in ways described herein and therefore not repeated here.

The target Telco node 820 finds 850-2 the C4 CDR it generated for the call based on the received CDR from the origin Telco node 810. Subsequently, the target Telco node 820 validates 850-3 that origin signed C4 CDR. Once validated 850-3 the target Telco node 820 generates 860-1 a combined CDR as explained herein and therefore not repeated here, noting that it contains therein at least the durations of the calls as notified by both origin Telco node 810 and target Telco node 820.

The combined signed C4 CDR is sent 860-1 to the origin Telco node 810. The secure combined C4 CDR is validated 860 by the origin Telco node 810 and their respective security measures are validated 860-4. Thereafter the call durations are compared 860-5 and as these will match no need to flag fraud 860-7. It is important to note that while it is unlikely to have a fraud detection occurring between the origin node 810 and target node 820 when using this method, it is possible that another node connected to either the origin Telco node 810 or the target Telco node 820 request a validation for the call C4 from either Telco nodes. This allows preventing and detecting fraud in such direct communication cases.

It should be appreciated that in an embodiment it is possible to have the call itself routed via one or more intermediary nodes while the secure CDR and secure combined CDR are exchanged directly between the origin Telco node and the target Telco node without departing from the scope of the disclosed embodiments.

It should be appreciated the real-time advantages of the disclosed embodiments for fraud detection. However, and without departing from the scope of the invention, other embodiments are possible which do not involve necessarily a real-time implementation. These include, without limitation, near real-time embodiments and off-line embodiments. Furthermore, though much of the details herein reflect fraud detection based on one of the parameters provided by the CDRs, namely call durations, other parameters may be used alternatively or in combination for the purposes of fraud detection without departing from the scope of the invention. The combination of detection of a discrepancy between a provided parameter of the CDR and the use of an authentication signature provide the advantages of the invention as described in detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting of fraudulent calls, comprising:
   initiating, by an origin node, a call to a target node;
   generating, by the origin node, a first call data record (CDR) for the call, wherein the CDR includes at least one call parameter of the call recorded by the origin node upon termination of the call;
   generating, by the origin node, a first secure CDR that contains the first CDR;
   sending, by the origin node, the first secure CDR to the target node; and
   generating, by the origin node, a fraud notification based on a second secure CDR received from a first node and the first secure CDR, wherein the first node is different from the origin node, and wherein the fraud notification is generated in response to a comparison of secure CDRs generated by two different nodes.

2. The method of claim 1, wherein the first node is any one of: the target node and at least one intermediary node between the origin node and the target node.

3. The method of claim 2, wherein generating the fraud notification further comprises:
   generating the fraud notification upon determination that the second secure CDR received by the origin node from the at least one intermediary node resulted in false validation.

4. The method of claim 3, wherein the false validation includes any one of: the second secure CDR received contained a time duration mismatch between respective call parameters recorded by the origin node and provided by the target node in the second secure CDR, and no second secure CDR is received within a predetermined time period from the sending of the first secure CDR.

5. The method of claim 2, wherein each of the origin node, the target node, and the at least one intermediary node is a node of a Telco provider.

6. The method of claim 1, wherein the call is at least one of: a voice call, a video call, and a data call.

7. The method of claim 2, where initiating the call further comprises:
   transferring the call via the at least one intermediary node.

8. The method of claim 7, wherein sending the first secure CDR further comprises:
   sending the first secure CDR via the intermediary node.

9. The method of claim 1, wherein the secure CDR comprises an authentication signature.

10. The method of claim 1, wherein the at least one call parameter is a call duration.

11. The method of claim 1, further comprising:
    validating the call upon determination that no fraud was detected.

12. A non-transitory computer readable medium having stored thereon instructions for causing a processing circuitry to execute the method of claim 1.

13. A method for detecting of fraudulent calls, comprising:
    receiving, by a target node, a call by the target node from an origin node initiating the call;
    generating, by the target node, a first call data record (CDR) that includes at least one call parameter recorded by the target node upon termination of the call;
    receiving, by the target node, a first secure CDR that contains the first CDR, wherein the first secure CDR is received from a node different from the target node; and
    generating, by the target node, a fraud notification when the first secure CDR is determined to be invalid.

14. The method of claim 13, wherein the first secure CDR is determined to be invalid upon determination of any one: a call parameter recorded by the origin node mismatches a respective call parameter recorded by the target node, and when the first secure CDR received by the target node after a predetermined time period.

15. The method of claim 13, wherein the call is at least one of: a voice call, a video call, and a data call.

16. The method of claim 13, further comprising:
    receiving the call via at least one intermediary node; and
    receiving the first secure CDR from the at least one intermediary node.

17. The method of claim 16, wherein each of the origin node, the target node, and the at least one intermediary node is a node of a Telco provider.

18. The method of claim 13, wherein the first secure CDR comprises an authentication signature.

19. The method of claim 13, further comprising:
sending to the origin node a combined secure CDR, wherein the combined secure CDR includes at least a call parameter of the call as received by the target node and the respective call parameter of the call as recorded by the target node.

20. The method of claim 19, wherein sending to the origin node a combined secure CDR comprises: sending the combined secure CDR to an intermediary node.

21. The method of claim 18, further comprising:
generating the first secure CDR using an authentication signature.

22. A non-transitory computer readable medium having stored thereon instructions for causing a processing circuitry to execute the method of claim 13.

23. A Telco provider origin node for detecting of fraudulent calls, comprising:
a processing circuitry; and
a memory, the memory containing instructions that, when executed by the processing circuitry, configure the origin node to:
initiate a call to a target node;
generate a first call data record (CDR) for the call, wherein the CDR includes at least one call parameter of the call recorded by the origin node upon termination of the call;
generate a first secure CDR that contains the first CDR;
send the first secure CDR to the target node; and
generate a fraud notification based on a second secure CDR received from a first node and the first secure CDR, wherein the first node is different from the origin node, and wherein the fraud notification is generated in response to a comparison of secure CDRs generated by two different nodes.

24. A Telco provider target node for detecting of fraudulent calls, comprising:
a processing circuitry; and
a memory, the memory containing instructions that, when executed by the processing circuitry, configure the target node to:
receive a call by the target node from an origin node initiating the call;
generate a first call data record (CDR) that includes at least one call parameter recorded by the target node upon termination of the call;
receive a first secure CDR that contains the first CDR, wherein the first secure CDR is received from a node different than the target node; and
generate a fraud notification when the first secure CDR is determined to be invalid.

* * * * *